United States Patent
Kang et al.

(10) Patent No.: US 9,904,404 B2
(45) Date of Patent: Feb. 27, 2018

(54) ELECTRONIC DEVICE HAVING TOUCH SENSOR AND DRIVING METHOD THEREOF

(71) Applicant: LG Display Co., Ltd., Seoul (KR)

(72) Inventors: Hyeongwon Kang, Seoul (KR); Jaehun Jun, Seoul (KR); Dukhyo Lee, Seoul (KR); Beomjin Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 14 days.

(21) Appl. No.: 14/875,502

(22) Filed: Oct. 5, 2015

(65) Prior Publication Data

US 2016/0098141 A1    Apr. 7, 2016

(30) Foreign Application Priority Data

Oct. 6, 2014  (KR) .................... 10-2014-0134027
Sep. 25, 2015  (KR) .................... 10-2015-0136834

(51) Int. Cl.
  *G06F 3/041*  (2006.01)
  *G06F 3/044*  (2006.01)
  *G06F 1/32*   (2006.01)

(52) U.S. Cl.
  CPC .......... *G06F 3/0416* (2013.01); *G06F 1/3262* (2013.01); *G06F 1/3265* (2013.01); *G06F 3/044* (2013.01); *G06F 3/0412* (2013.01); *G06F 2203/04112* (2013.01); *Y02B 60/1242* (2013.01)

(58) Field of Classification Search
  CPC ...... G06F 3/044; G06F 3/0412; G06F 1/3265; G06F 1/3262; G06F 2203/04112
  See application file for complete search history.

(56) References Cited

U.S. PATENT DOCUMENTS

| | | | |
|---|---|---|---|
| 8,816,985 B1 | 8/2014 | Tate et al. | |
| 9,304,575 B2 * | 4/2016 | Lee | G06F 1/3262 |
| 2011/0234523 A1 | 9/2011 | Chang et al. | |
| 2012/0169660 A1 | 7/2012 | Seo | |
| 2013/0265276 A1 * | 10/2013 | Obeidat | G06F 3/044 345/174 |
| 2013/0330017 A1 * | 12/2013 | Elias | G06F 3/0418 382/254 |

(Continued)

FOREIGN PATENT DOCUMENTS

| | | |
|---|---|---|
| CN | 102445799 A | 5/2012 |
| CN | 102681715 A | 9/2012 |

(Continued)

OTHER PUBLICATIONS

Taiwan Office Action, Taiwan Application No. 104132497, Oct. 28, 2016, 17 pages.

(Continued)

*Primary Examiner* — Lixi C Simpson
(74) *Attorney, Agent, or Firm* — Fenwick & West LLP

(57) ABSTRACT

A display device that comprises a plurality of touch electrodes and a touchscreen driving circuit coupled to the plurality of touch electrodes. In a normal display mode of the display device, the touchscreen driving circuit senses touch via the plurality of touch electrodes using self capacitance touch sensing. In a sleep mode of the display device, the touchscreen driving circuit senses touch via the plurality of touch electrodes using mutual capacitance touch sensing.

21 Claims, 12 Drawing Sheets

(56) References Cited

U.S. PATENT DOCUMENTS

2014/0362042 A1* 12/2014 Noguchi ............... G06F 3/0412
                                                    345/174
2016/0216836 A1*  7/2016 Yao ....................... G06F 3/0418
2016/0282976 A1*  9/2016 Yang ...................... G06F 3/044

FOREIGN PATENT DOCUMENTS

| CN | 104020912 A     | 9/2014  |
|----|-----------------|---------|
| EP | 2562627 A1      | 2/2013  |
| KR | 10-2012-0028553 | 3/2012  |
| TW | 201133319 A     | 10/2011 |
| TW | 201215975 A     | 4/2012  |
| TW | 201227482 A     | 7/2012  |
| TW | 201337690 A     | 9/2013  |

OTHER PUBLICATIONS

European Extended Search Report, European Application No. 15188531.6, Jan. 22, 2016, 7 pages.
Korean Office Action, Korean Application No. 10-2015-0136834, Jun. 21, 2016, 4 pages (with concise explanation of relevance).
Chinese First Office Action, Chinese Application No. 201510647203.4, dated Nov. 10, 2017, 13 pages.

* cited by examiner (a)

(b)

ELECTRONIC DEVICE HAVING TOUCH SENSOR AND DRIVING METHOD THEREOF

This application claims the benefit of Korean Patent Application No. 10-2014-0134027, filed on Oct. 6, 2014, and Korean Patent Application No. 10-2015-0136834, filed on Sep. 25, 2015, which are both incorporated herein by reference for all purposes as if fully set forth herein.

BACKGROUND

Technical Field

The present disclosure relates to an electronic device having a touch sensor and a driving method thereof.

Discussion of the Related Art

As the weights and thicknesses of electronic devices such as home appliances and portable information devices are decreased, a user input means is changed from a button type switch to a touch sensor. Accordingly, electronic devices such as a recent display device have a touch sensor (or touchscreen).

The touch sensor is essentially included in portable information devices such as smartphones and is also applied to notebook computers, computer monitors, home appliances and the like. Recently, a technology for embedding the touch sensor in a pixel array of a display panel (referred to as "in-cell touch sensor" hereinafter) has been proposed.

The in-cell touch sensor technology can install touch sensors in a display panel without increasing the thickness of the display panel. An electronic device having an in-cell touch sensor time-divides a pixel driving period (which is also referred to as "display driving period") and a touch sensor driving period (which is also referred to as "touchscreen driving period") in order to reduce the mutual influence of pixels and touch sensors due to coupling of the pixels and the touch sensors.

The in-cell touch sensor technology uses electrodes connected to the pixels of the display panel as electrodes of the touch sensors. For example, the in-cell touch sensor technology divides a common electrode for supplying a common voltage to pixels of a liquid crystal display and uses the divided common electrodes as electrodes of touch sensors.

In addition, in the in-cell touch sensor technology, a function of entering a sleep mode (or idle mode) when a display device is not used has been proposed. The sleep mode reduces power consumption of the display device by allowing the display panel to be idle when the display device is not used. However, it is necessary to continue research on a sleep mode for reducing power consumption.

SUMMARY

In another embodiment, a display device comprises a plurality of touch electrodes; and a touchscreen driving circuit coupled to the plurality of touch electrodes. In a normal display mode of the display device, the touchscreen driving circuit senses touch via the plurality of touch electrodes using self capacitance touch sensing. In a sleep mode of the display device, the touchscreen driving circuit senses touch via the plurality of touch electrodes using mutual capacitance touch sensing.

In one embodiment, the touchscreen driving circuit is to, in the sleep mode of the display device, short a first set of the touch electrodes along a line into a first transmit channel, short a second set of the touch electrodes along a line into a receive channel, drive a first touch driving signal onto the first transmit channel, and sense touch from a voltage of the receive channel, the voltage generated based on the touch driving signal on the first transmit channel and a mutual capacitance between the first transmit channel and the receive channel.

In one embodiment, the first transmit channel is parallel to the receive channel.

In one embodiment, the touchscreen driving circuit is to short a third set of the touch electrodes along a line into a second transmit channel; drive a second touch driving signal onto the second transmit channel. The voltage of the receive channel is further generated based on the second touch driving signal and a mutual capacitance between the second transmit channel and the receive channel. In one embodiment, the first touch driving signal and the second touch driving signal are complementary signals.

In yet another embodiment, a display device comprises a plurality of touch electrodes and a touchscreen driving circuit coupled to the plurality of touch electrodes. In a normal display mode of the display device, the touchscreen driving circuit senses touch via the plurality of touch electrodes. In a sleep mode of the display device, the touchscreen driving circuit short circuits a first set of the touch electrodes together and senses touch via the first set of short circuited touch electrodes.

In one embodiment, the first set of the touch electrodes are shorted along a line into a first transmit channel. The touchscreen driving circuit is to, in the sleep mode of operation: short a second set of the touch electrodes along a line into a receive channel; drive a first touch driving signal onto the first transmit channel; and sense touch from a voltage of the receive channel, the voltage generated based on the touch driving signal on the first transmit channel and a mutual capacitance between the first transmit channel and the receive channel.

In one embodiment, the first transmit channel is parallel to the receive channel.

In one embodiment, the touchscreen driving circuit is to, in the sleep mode of operation: short a third set of the touch electrodes along a line into a second transmit channel; drive a second touch driving signal onto the second transmit channel. The voltage of the receive channel is further generated based on the second touch driving signal and a mutual capacitance between the second transmit channel and the receive channel.

In one embodiment, the first set of short circuited touch electrodes comprises all touch electrodes of the display device. In one embodiment, the first set of short circuited touch electrodes comprises two or more lines of the touch electrodes.

BRIEF DESCRIPTION OF THE DRAWINGS

The accompany drawings, which are included to provide a further understanding of the disclosure and are incorporated in and constitute a part of this specification illustrate embodiments of the disclosure and together with the description serve to explain the principles of the disclosure.

DETAILED DESCRIPTION OF PREFERRED EMBODIMENTS

Reference will now be made in detail to embodiments of the disclosure examples of which are illustrated in the accompanying drawings.

An electronic device having a touch sensor according to the present disclosure is implemented as a TV, a set-top box, a navigation system, a video player, a Blu-ray player, a personal computer (PC), a home theater, a mobile phone and the like.

For example, the electronic device having a touch sensor according to the present disclosure is implemented as a display panel. While a flat panel display, such as a liquid crystal display (LCD) panel, an electrophoretic display panel and a plasma display panel, may be selected as the display panel, the display panel is not limited thereto. However, the liquid crystal display (LCD) panel is provided as the display panel in the following description for convenience.

First Embodiment

Figure 1:
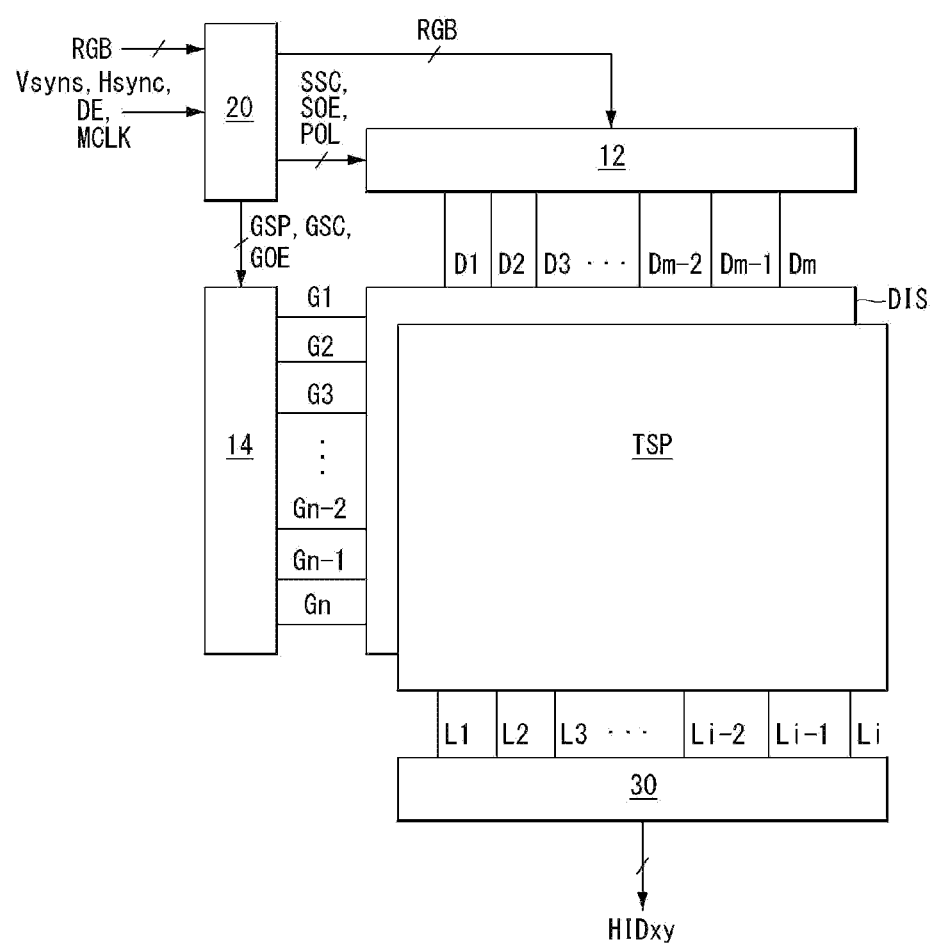
FIG. 1 is a block diagram illustrating a configuration of a display device according to a first embodiment of the present disclosure.
Figure 2:
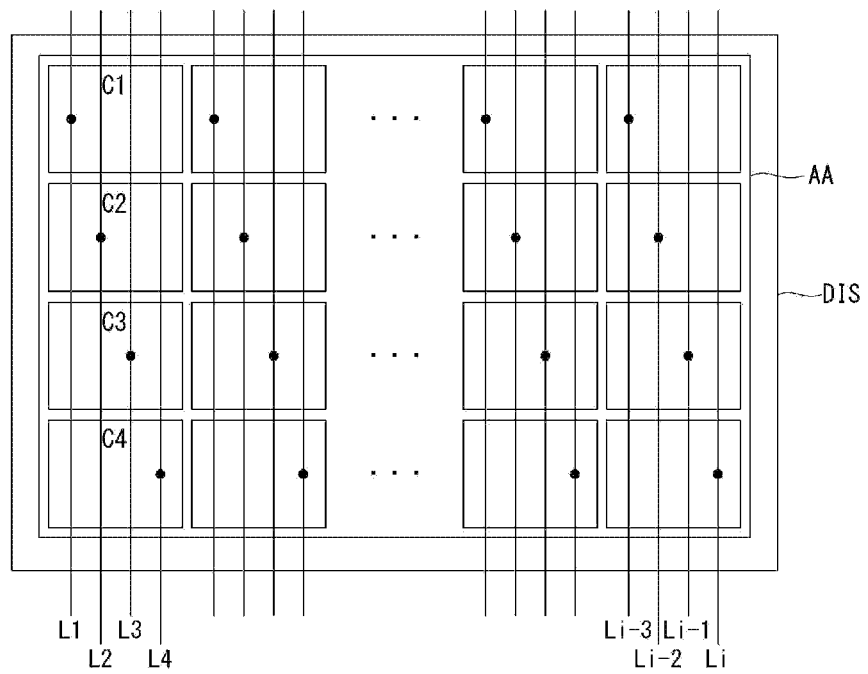
FIG. 2 illustrates touch sensors of a touchscreen.
Figure 3:
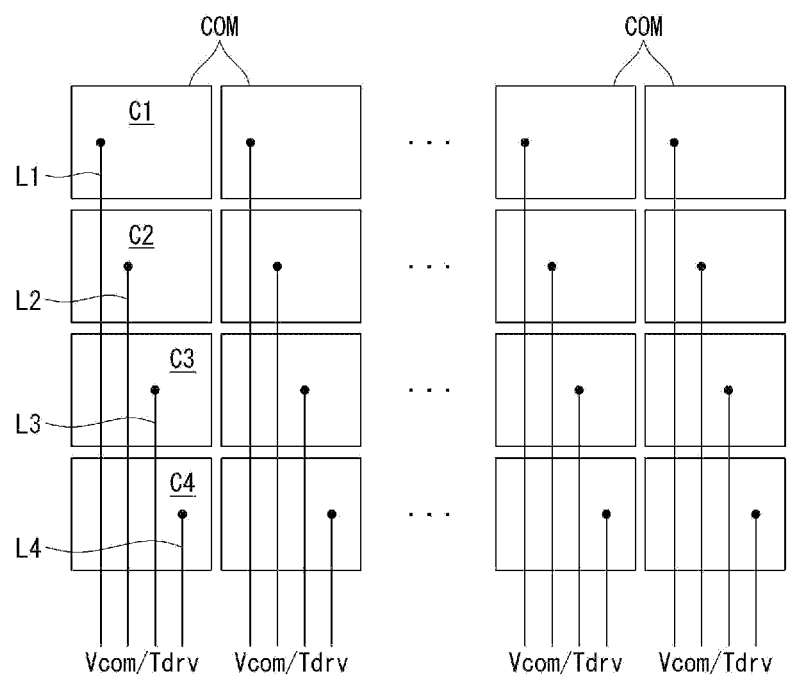
FIG. 3 illustrates a touchscreen including common electrodes.
Figure 4:
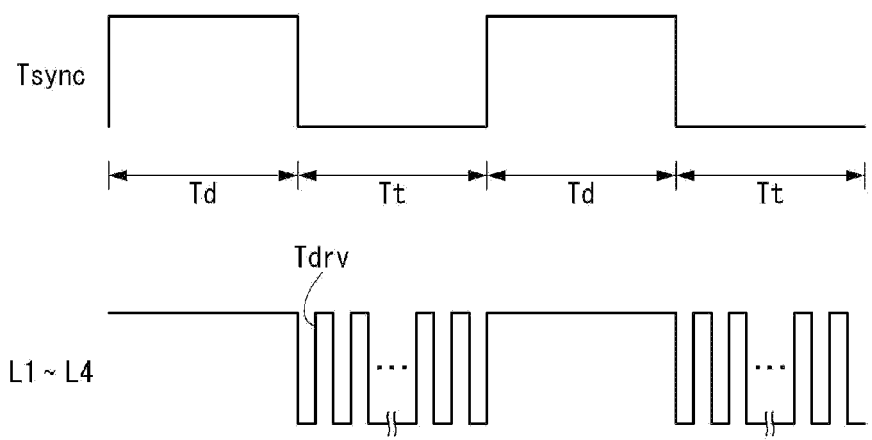
FIG. 4 is a waveform diagram for describing an in-cell touch time-division driving technique.

FIG. 1 is a block diagram illustrating a configuration of a display device according to the first embodiment of the present disclosure, FIG. 2 illustrates touch sensors of a touchscreen, FIG. 3 illustrates a touchscreen having common electrodes formed therein and FIG. 4 is a waveform diagram for describing an in-cell touch time-division driving technique.

As shown in FIG. 1, the display device according to the first embodiment of the present disclosure includes a timing controller 20, a data driving circuit 12, a scan driving circuit 14, an LCD panel DIS, a touchscreen TSP and a touchscreen driving circuit 30.

The timing controller 20 receives, from a host system (not shown), digital video data RGB along with timing signals such as a vertical synchronization signal Vsync, a horizontal synchronization signal Hsync, a data enable signal DE and a main clock signal MCLK and controls the data driving circuit 12 and the scan driving circuit 14 on the basis of the received signals.

The timing controller 20 controls the scan driving circuit 14 on the basis of scan timing control signals such as a gate start pulse signal GSP, a gate shift clock signal GSC and a gate output enable signal GOE. The timing controller 20 controls the data driving circuit 12 on the basis of data timing control signals such as a source sampling clock signal SSC, a polarity control signal POL and a source output enable signal SOE.

The data driving circuit 12 generates a data voltage by converting the digital video data RGB input from the timing controller 20 into an analog positive/negative gamma compensation voltage. The data driving circuit 12 supplies the data voltage through data lines D1 to Dm.

The scan driving circuit 14 sequentially generates gate pulse (or scan pulse) signals synchronized with the data voltage. The scan driving circuit 14 provides the gate pulse signals through gate lines G1 to Gn.

The LCD panel DIS displays an image on the basis of the gate pulse signals supplied from the scan driving circuit 14 and the data voltage supplied from the data driving circuit 12. The LCD panel DIS includes a liquid crystal layer interposed between two substrates. The LCD panel DIS can be implemented with any known liquid crystal type of panel such as twisted nematic (TN) type, vertical alignment (VA) type, in-plane switching (IPS) type and fringe field switching (FFS) type.

Sub-pixels of the LCD panel DIS are defined by the data lines D1 to Dm (m being an integer equal to or greater than 2) and the gate lines G1 to Gn (n being an integer equal to or greater than 2). One sub-pixel includes a thin film transistor (TFT) formed at each of intersections of the data lines and the gate lines, a pixel electrode charging the data voltage, a storage capacitor Cst connected to the pixel electrode and maintaining a voltage of a liquid cell and the like.

An upper substrate of the LCD panel DIS includes a black matrix, a color filter and the like formed thereon. A lower substrate of the LCD panel DIS includes TFTs, pixel electrodes, a common electrode and the like formed thereon. The LCD panel DIS may be implemented with a color filter on TFT (COT) structure. In this case, the black matrix and the color filter can be formed on the lower substrate of the LCD panel DIS.

The common electrode to which a common voltage is supplied may be formed on the upper substrate or the lower substrate of the LCD panel DIS. Polarizers are respectively attached to the upper substrate and the lower substrate of the LCD panel DIS and an alignment film for setting a pretilt angle of the liquid crystal is formed on the inner surfaces of the upper substrate and the lower substrate, which come into contact with the liquid crystal.

A column spacer for maintaining a cell gap of the liquid crystal cell is formed between the upper substrate and the lower substrate of the LCD panel DIS. A backlight unit is provided under the backside of the lower polarizer of the LCD panel DIS. The backlight unit is implemented as an edge type or direct type backlight unit and provides light to the LCD panel DIS.

The touchscreen driving circuit 30 senses presence or absence of touch and a touch point using the touchscreen TSP. The touchscreen driving circuit 30 includes a driving circuit for generating a driving voltage for driving touch sensors and a sensing circuit for sensing the touch sensors and generating data for detecting presence or absence of touch, coordinate information and the like. The driving circuit and the sensing circuit of the touchscreen driving circuit 30 may be formed as one integrated circuit (IC) or separately configured.

The touchscreen driving circuit 30 is formed on an external substrate connected to the LCD panel DIS. The touchscreen driving circuit 30 is connected to the touchscreen TSP through sensing lines L1 to Li (i being a positive integer). The touchscreen driving circuit 30 senses presence or absence of touch and a touch point on the basis of a capacitance deviation between touch sensors included in the touchscreen TSP.

A capacitance deviation is generated between a point touched by a user's finger and a point that is not touched. The touchscreen driving circuit 30 senses presence or absence of touch and a touch point by sensing the capacitance deviation. The touchscreen driving circuit 30 generates touch data HIDxy regarding presence or absence of touch and a touch point and transmits the touch data HIDxy to the host system (not shown).

Referring to FIG. 2, the touchscreen TSP is implemented in such a manner that the touchscreen TSP is embedded in a display area AA of the LCD panel DIS as an in-cell self touch (referred to as "self touch" hereinafter) sensing type touchscreen. The self touch sensing type touchscreen TSP uses electrodes, which are configured in the form of blocks (or points) by electrodes formed inside of the LCD panel DIS, as touch sensors.

"C1, C2, C3 and C4" in the display area AA of the LCD panel DIS refer to touch sensors (or touch sensor blocks) and "L1, L2, L3 and L4" refer to sensing lines connected to the touch sensors. The following description is based on an example of configuring touch sensors with common electrodes.

As shown in FIG. 3, in the self touch sensing type touchscreen TSP, common electrodes COM included in M (M being an integer equal to or greater than 4) sub-pixels (e.g., 32 horizontal sub-pixels*32 vertical sub-pixels) formed inside of the LCD panel DIS constitute one touch sensor. That is, the touch sensors C1, C2, C3 and C4 are defined by common electrodes COM separately formed in the LCD panel DIS.

As shown in FIGS. 1, 2 and 3, the touchscreen driving circuit 30 supplies a touch driving signal Tdrv through sensing lines L1 to L4 connected to the self touch sensing type touchscreen TSP.

When the touchscreen driving circuit 30 senses the touchscreen TSP in a self touch sensing manner, the touchscreen driving circuit 30 senses an RC delay difference Δt between a touch state and a no-touch state through the sensing lines L1 to L4 and recognizes that touch has been applied when an RC delay difference between neighboring touch sensors C1 to C4 exceeds a reference value.

Referring to FIG. 4, in the case of the display device having the self touch sensing type touchscreen, a display driving period Td in which an image is displayed on the LCD panel DIS and a touchscreen driving period Tt in which the touchscreen TSP is sensed are divided in time. That is, the display driving period Td and the touchscreen driving period Tt are time-division multiplexed.

The sensing lines L1 to L4 are provided with a common voltage Vcom for the display driving period Td and provided with the touch driving signal Tdrv for the touchscreen driving period Tt. The touch driving signal Tdrv is generated in the form of an AC signal. A synchronization signal Tsync for time-dividing the display driving period Td and the touchscreen driving period Tt may be generated by the timing controller or the host system.

While the touchscreen driving circuit 30 senses presence or absence of touch and a touch point in the touchscreen TSP through the self capacitance touch sensing method in the above description, the touchscreen driving circuit 30 may sense presence or absence of touch and a touch point with respect to the touchscreen TSP through a mutual capacitance touch sensing method. In this case, the LCD panel DIS includes Tx lines for transmitting the touch driving signal and Rx lines for receiving voltages that vary due to touch and are indicative of varying capacitance values.

Figure 5:
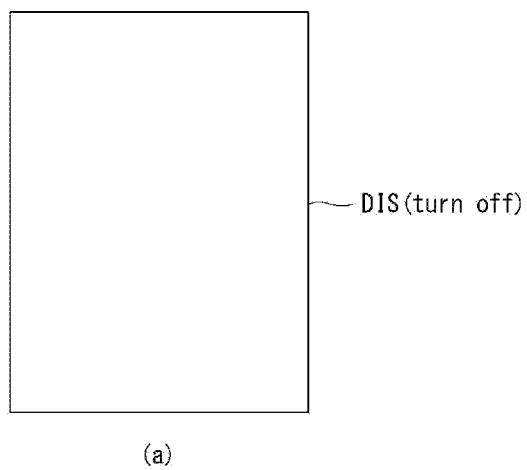
FIG. 5 is a view for describing a low-power driving method of a display device.
Figure 5:
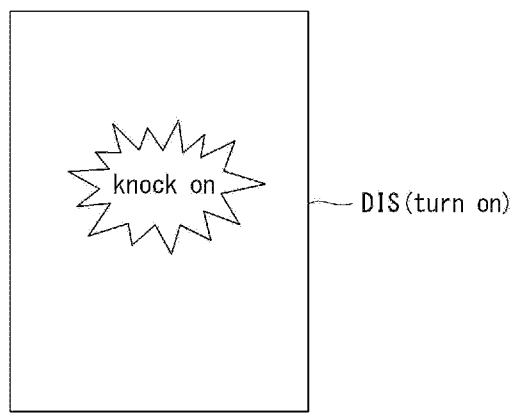
Figure 6:
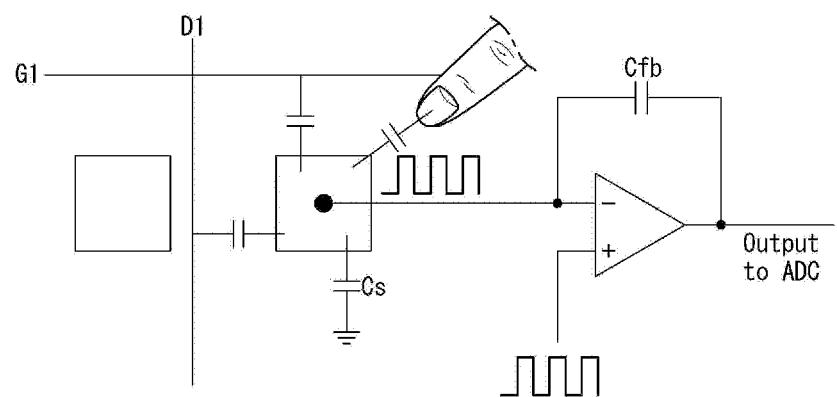
FIG. 6 is a view for describing a conventional sensing method.

FIG. 5 is a view for describing a low-power driving method of the display device and FIG. 6 is a view for describing a conventional sensing method.

As shown in FIG. 5(a), the above-described display device enters a sleep mode (or idle mode) when a user does not use the display device. When the user touches the screen of the LCD panel DIS X times as if the user knocks on the screen, as shown in FIG. 5(b), the display device awakes from the sleep mode.

The function illustrated in FIG. 5 is called "knock-on". As shown in FIG. 5, knock-on can reduce power consumption of the display device in such a manner that the LCD panel becomes idle when the display device is not used. However, it is necessary to continue research on the sleep mode for reducing power consumption.

[Review on Conventional Sensing Method]

As shown in FIG. 6, in a conventional self touch sensing scheme, capacitance Cs of a touch sensor appears in a coupling form due to a gate line G1 and a data line D1 which are adjacent to each other.

To solve such problem, a conventional method reduces the capacitance Cs of the touch sensor by generating the same voltage as a modulation voltage of a touch driving signal supplied to sensing lines and providing the generated voltage to the gate line G1 and the data line D1.

When the self touch sensing is operated as in the conventional method, capacitance of the touch sensor is reduced, sensitivity increases as the influence of finger capacitance increases and the touch sensor becomes insensitive to noise. Accordingly, restrictions on driving capability of the touchscreen driving circuit are mitigated and thus physical size of the circuit can be reduced.

However, to apply the conventional method to the knock-on function, an analog circuit for generating and buffering the modulation voltage of the touch driving signal is required. When the analog circuit is added, current consumption increases and current may increase according to load of gate lines and data lines.

For such reason, it is difficult to satisfy current specifications only by using the conventional method in sleep mode operation for the knock-on function and a large amount of resources needs to be additionally used.

When the conventional method is not used, however, the capacitance of the touch sensor increases. Accordingly, it is necessary to adopt a method for avoiding an output range limit such as reducing the modulation voltage, restricting the number of integrations or increasing a feedback capacitor Cfb of the touchscreen driving circuit for normal operation.

However, when the above example is used, a signal to noise radio (SNR) is reduced. Furthermore, to solve a saturation problem caused by a very large capacitance (up to hundreds of pF) of the touch sensor, the capacitance of an internal capacitor of the touchscreen driving circuit needs to be increased in a similar range, which may be unrealizable.

[Concept of Sensing Method According to Embodiment]

Figure 7:
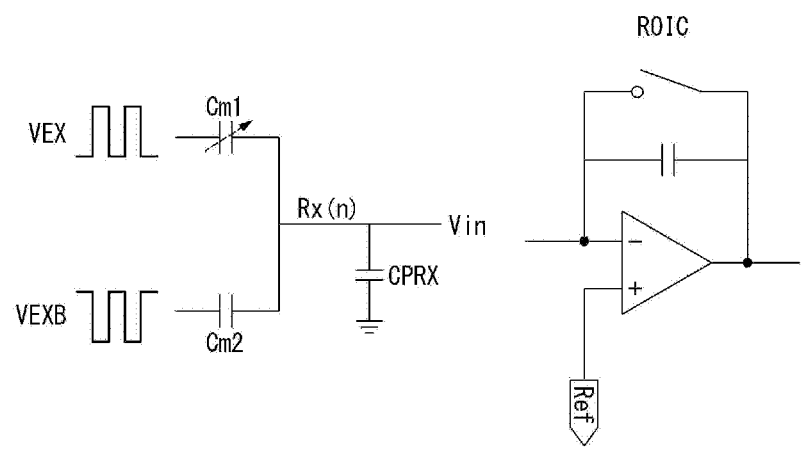
FIG. 7 is a view for describing a sensing method according to the first embodiment of the present disclosure.
Figure 8:
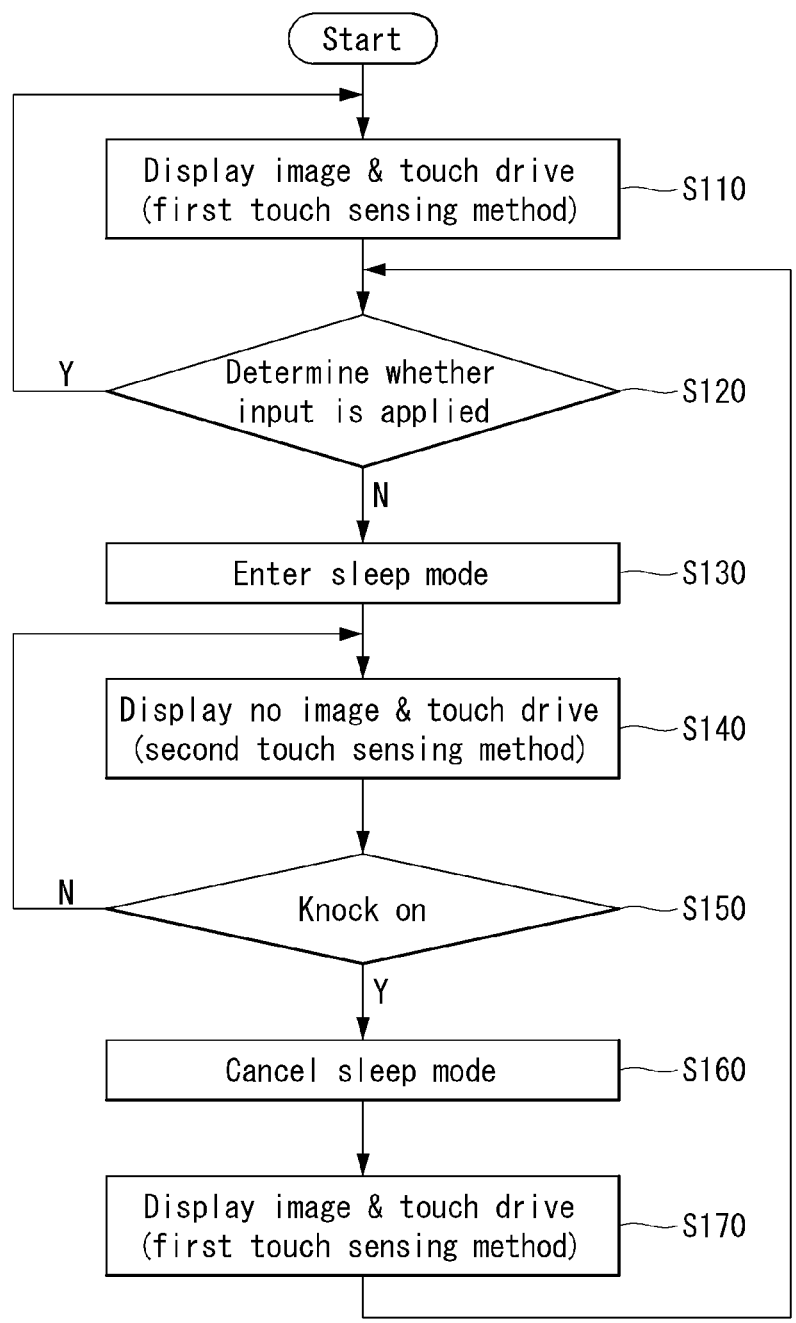
FIG. 8 is a flowchart illustrating a method for driving a display device according to the first embodiment of the present disclosure.

FIG. 7 is a view for describing a sensing method according to the first embodiment of the present disclosure and FIG. 8 is a flowchart illustrating a method for driving a display device according to the first embodiment of the present disclosure.

As shown in FIG. 7, the first embodiment of the present disclosure changes an electrode configuration of touch sensors for sleep mode operation for the knock-on function.

Specifically, common electrodes divided into blocks (or points) are connected per line in order to sense mutual capacitance Cm between touch sensors in sleep mode operation. That is, when the knock-on function is executed, the common electrodes are changed to bar type (or stripe type) touch sensor lines from block type electrodes.

For example, "Cm1" refers to a mutual capacitor between a first line Tx and a second line Rx, "Cm2" refers to a mutual capacitor between a third line Tx and the second line Rx, "Rx(n)" refers to a line formed between the first line TX and the third line TX, and "CPRX" refers to parasitic capacitance between the second line (Rx line) and the ground.

When driving voltages are applied to the Tx channels configured as above, a voltage transmitted to the receive channel Rx(n) is determined by a variation in the mutual capacitance Cm and the Tx driving voltages. Here, the driving voltages applied to the Tx channels may be generated in the form of complementary excitation pulses such as a first driving voltage VEX and a second driving voltage VEXB, for example. However, the present disclosure is not limited thereto. The complementary excitation pulses have strong resistance to signal distortion such as noise.

The touchscreen driving circuit (sensing circuit; ROIC) can sense mutual capacitance Cm between touch sensors from "Vin", which is represented by the following equation.

$$V_{in} = \frac{\Delta C_m (= C_{m1} - C_{m2})}{C_{m1} + C_{m2} + C_{PRx}} \cdot V_E$$

In the equation, $\Delta Cm$ indicates a difference between Cm1 and Cm2, Cm1 indicates capacitance generated in the touch sensor line of the first line, and Cm2 indicates capacitance generated in the touch sensor line of the second line. In addition, $C_{PRX}$ parasitic capacitance between the second line (Rx line) and the ground and VE represents a driving voltage, such as either Vex or Vexb.

According to the first embodiment of the present disclosure, electric charge applied to an input port (inverting port "−") of the touchscreen driving circuit (sensing circuit; ROIC) is determined by a capacitor divider and represented as a touch value corresponding to a mutual capacitance (Cm) variation.

Accordingly, the output of the sensing circuit ROIC is determined according to dividing of the mutual capacitance and parasitic capacitance Cprx (capacitance of Rx parasitic electrode) inside the touchscreen and the sensing circuit can be designed such that only a feedback capacitor is present in the sensing circuit ROIC.

Therefore, the first embodiment of the present disclosure may not be saturated during self touch sensing, which occurs in the conventional method. In addition, the first embodiment of the present disclosure can amplify a mutual capacitance (Cm) variation to higher than a detectable voltage (touch threshold) by increasing a gain of an integrator and the number of integrations in order to increase a small mutual capacitance (Cm) variation as necessary.

Accordingly, when the display device enters the sleep mode for the knock-on function in the first embodiment of the present disclosure, the display is converted from a self touch sensing display into a mutual touch sensing display. The first embodiment of the present disclosure can reduce power consumption while maintaining touch driving stability and reliability during execution of the knock-on function by the display device having touch sensors.

This is because the mutual touch sensing method can detect a desired touch level without saturating an output of the sensing circuit ROIC since the mutual touch sensing method amplifies only a mutual capacitance (Cm) variation. That is, the mutual touch sensing method does not cause output range to be limited (saturation of output) even when capacitance of a touch sensor increases.

As shown in FIG. 8, the method for driving the display device according to the first embodiment of the present disclosure reduces power consumption while maintaining driving stability and reliability during execution of the knock-on function.

According to the first embodiment of the present disclosure, the display device displays an image and is driven by touch driving signals in a normal driving state (S110). The touchscreen is sensed through a first touch sensing method in an image display and touch driving period (normal mode or non-sleep mode). The first touch sensing method can be the self capacitance touch sensing method. Whether input is applied is determined continuously (or periodically) in the normal driving state (S120).

When input is applied (Y), the display device displays an image, is driven by touch signals and senses touch through the first touch sensing method (S110). When input is not applied (N), the display device enters the sleep mode (S130).

In the sleep mode, the display device does not display an image and is driven by touch driving signals (S140). In an image non-display and touch driving period (sleep mode), the touchscreen is sensed through a second touch sensing method. The second touch sensing method can be the mutual capacitance touch sensing method. Whether knock-on is generated (e.g. by a user double tapping on the screen) is detected continuously (or periodically) in the sleep mode (S150).

When knock-on is not generated (N), the display device does not display an image, is driven by touch and senses the touchscreen through the second touch sensing method (S140). When knock-on is generated (Y), the display device exits the sleep mode (S160). That is, the touch sensing mode is switched according to whether knock-on is generated.

When the display device has exited the sleep mode, the display device displays an image and is driven by touch driving signals (S170). The display device senses the touchscreen for touches through the first touch sensing method in the image display and touch driving period (normal mode or non-sleep mode).

The method for driving the display device according to the first embodiment of the present disclosure senses touch on the touchscreen through the first touch sensing method when the display device operates in the normal driving state (normal mode or non-sleep mode). Here, the self capacitance touch sensing method is selected as the first touch sensing method.

When the display device operates in the sleep mode, the touchscreen is sensed through the second touch sensing method different from the first touch sensing method. Here, the mutual capacitance touch sensing method is selected as the second touch sensing method.

As described above with reference to FIG. 7, the mutual capacitance touch sensing method can reduce power consumption while maintaining driving stability and reliability during execution of the knock-on function, as compared to the self capacitance touch sensing method. Accordingly, the aforementioned benefits can be achieved simply by changing the touch sensing method.

An example for aiding in understanding the present disclosure is now explained. The following description focuses on a variation in electrode configuration of touch sensors and a sensing method change when the display device operates in the sleep mode.

Figure 9:
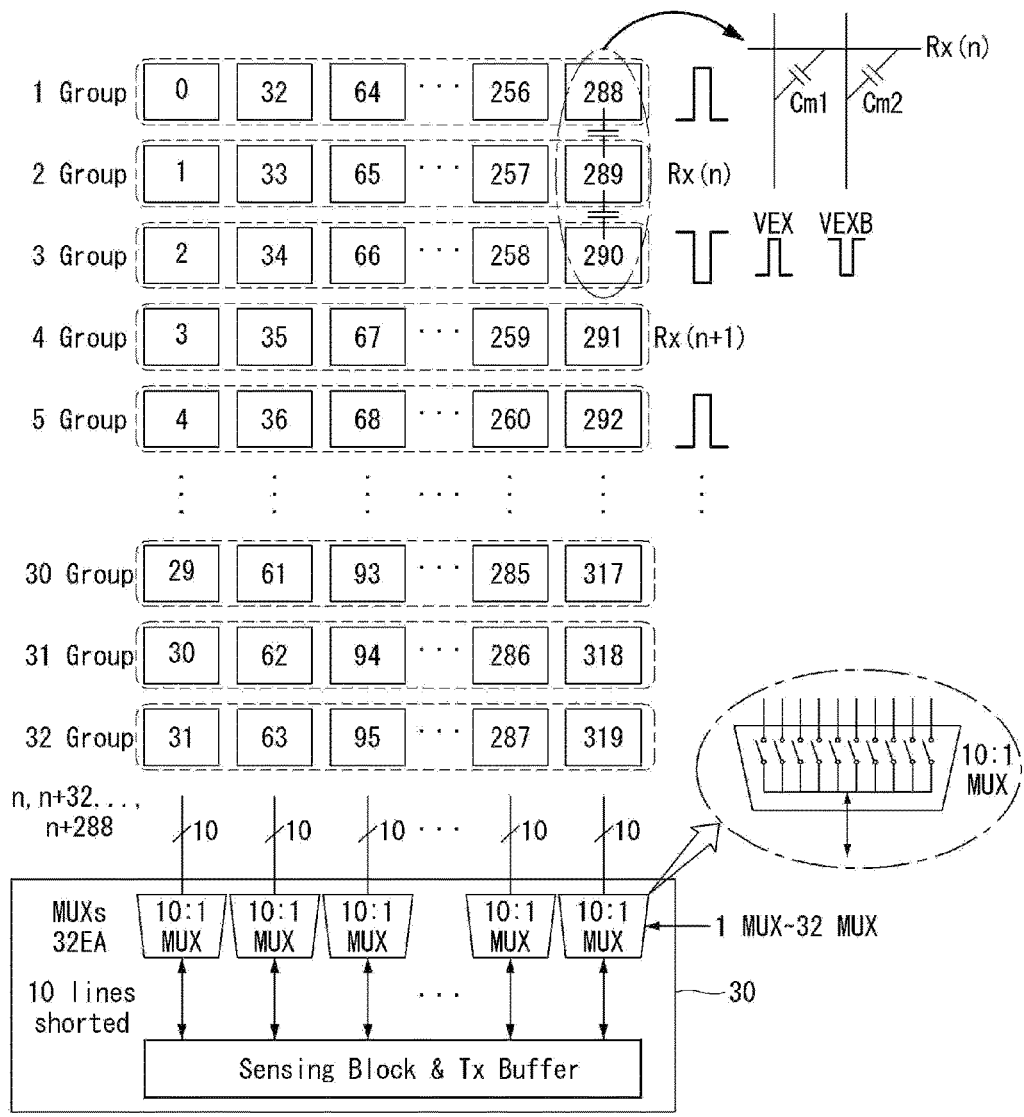
FIG. 9 illustrates a configuration of an apparatus according to the first embodiment of the present disclosure.
Figure 10:
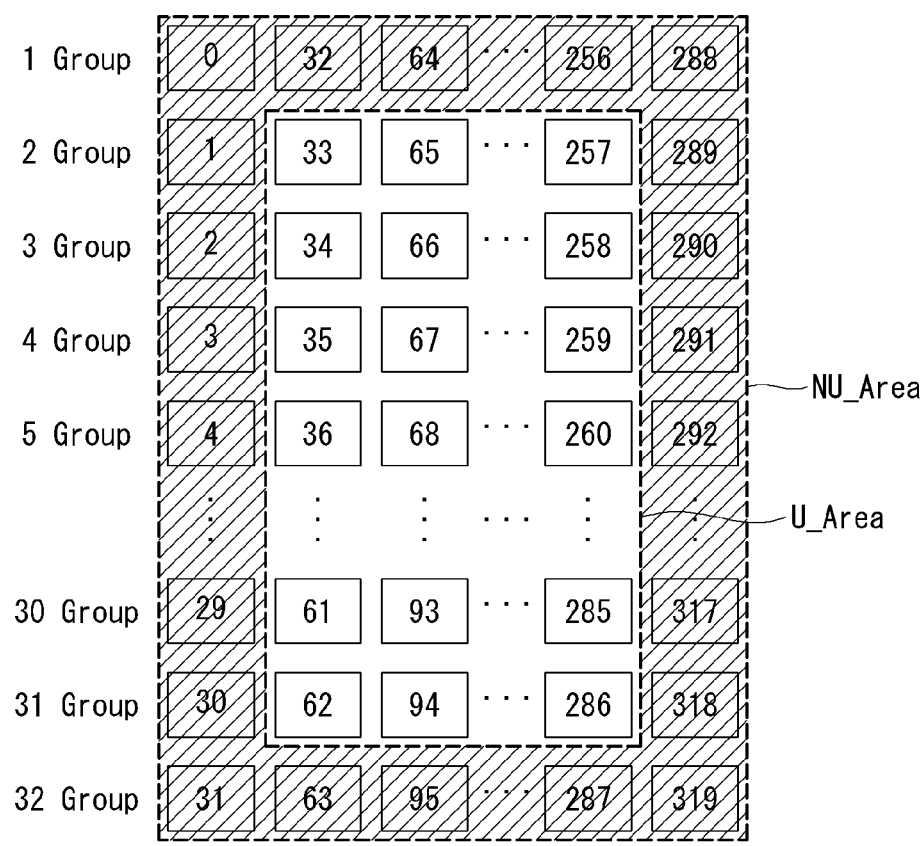
FIG. 10 illustrates operation characteristics of a peripheral line in a knock-on mode.
Figure 11:
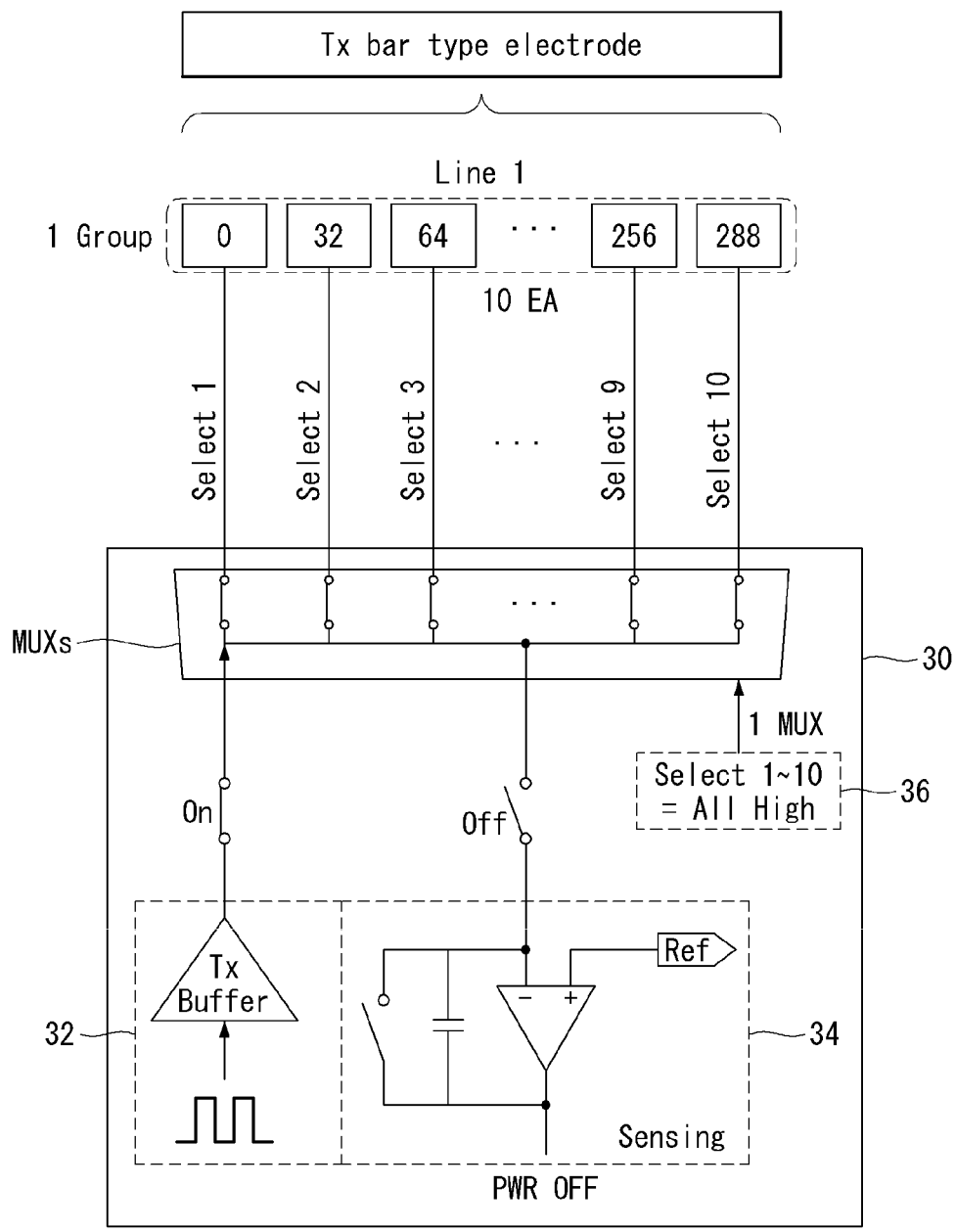
FIG. 11 illustrates driving of a first line shown in FIG. 9.
Figure 12:
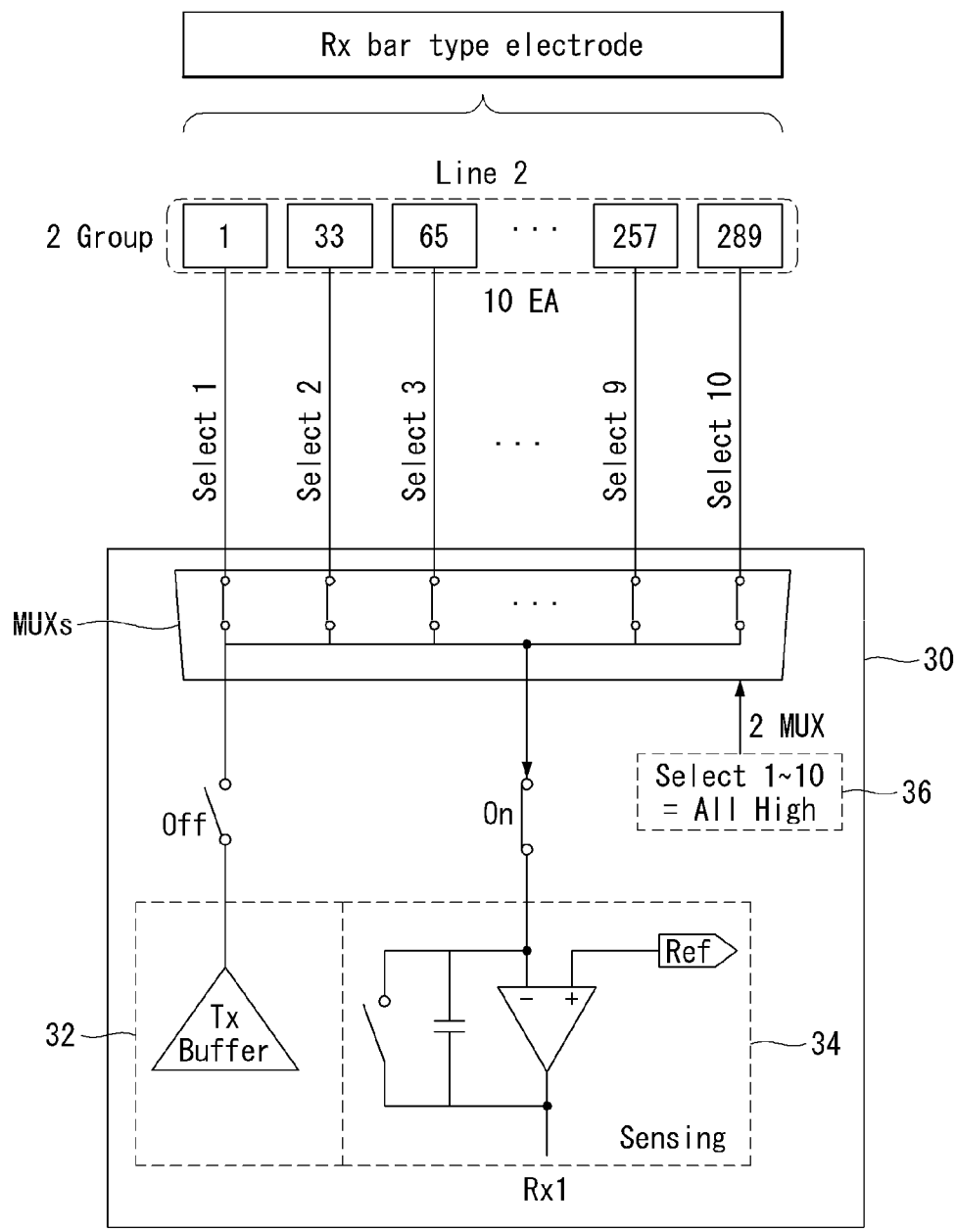
FIG. 12 illustrates driving of a second line shown in FIG. 9.

FIG. 9 illustrates a configuration of an apparatus according to the first embodiment of the present disclosure, FIG. 10 illustrates driving of a first line shown in FIG. 9, FIG. 11 illustrates driving of a second line shown in FIG. 9 and FIG. 12 illustrates driving of a third line shown in FIG. 9.

As shown in FIG. 9, according to the first embodiment of the present disclosure, touch sensor electrodes configured in the form of blocks (or points) are changed to parallel bar type electrodes when the display device operates in the sleep mode.

For example, touch sensor electrodes 0, 32, 64, . . . , 256 and 288 configured in the form of blocks in the first line are short-circuited by a first MUX signal 1MUX, and thereby changed to a bar type electrode. In addition, touch sensor electrodes 1, 33, 65, . . . , 257 and 289 configured in the form of blocks in the second line are short-circuited by a second MUX signal 2MUX, and thereby changed to a bar type electrode.

In this manner, the touch sensor electrodes corresponding to the third to thirty-second lines are respectively short-circuited by third to thirty-second MUX signals 3MUX to 32MUX, and thereby changed to bar type electrodes.

Change of the block type touch sensor electrodes to bar type electrodes by being short-circuited by the first to thirty-second MUX signals 1MUX to 32MUX line by line means that the display device includes switches for electrically connecting blocks in the horizontal direction or a device capable of executing a function corresponding thereto, which is not shown.

In the following description, touch sensor electrodes 0, 32, 64, . . . , 256 and 288 in the first line to touch sensor electrodes 31, 63, 95, . . . , 287 and 319 in the thirty-second line are referred to as first to thirty-second touch sensor groups 1Group to 32Group.

The first touch sensor group 1Group to the thirty-second touch sensor group 32Group are coupled to multiplexers MUXs column by column. While the multiplexers MUXs are 10:1 MUXs including one input channel and ten output channels in the present embodiment, the present disclosure is not limited thereto.

The multiplexers MUXs are included in the touchscreen driving circuit 30. The multiplexers MUXs are connected to the sensing circuit and driving circuit (sensing block & Tx buffer) included in the touchscreen driving circuit 30.

The multiplexers MUXs are driven in a time division manner and selectively control touch channels electrically connected to the sensing circuit and driving circuit (sensing block & Tx buffer). A touch channel refers to a short circuited line of touch sensor electrodes.

In the aforementioned configuration, the touchscreen driving circuit 30 short-circuits ten blocks in each line by internally generating first to thirty-second MUX signals 1MUX to 32MUX (not shown in FIG. 9) so as to change one line into a touch sensor group when the display device operates in the sleep mode. That is, the touchscreen driving circuit 30 changes the electrode configuration of the touchscreen.

While touch sensors are present in the form of blocks when the display device operates in the normal mode (or non-sleep mode), 32 touch sensors are present in the form of lines when the display device operates in the sleep mode. The numbers of touch sensors, multiplexers MUXs and MUX signals described above are exemplary and the present disclosure is not limited thereto.

When the display device operates in the sleep mode, the touchscreen driving circuit 30 divides the touch channels thereof into Tx channels and Rx channels while changing the electrode configuration of the touchscreen. Here, the touchscreen driving circuit 30 can divide the touch channels thereof into i (i being an integer equal to or greater than 2) Tx channels and j (j being an integer equal to or greater than 2) Rx channels.

For example, a sensing line connected to the first touch sensor group 1Group is changed to a Tx channel, a sensing line connected to the second touch sensor group 2Group is changed to an Rx channel and a sensing line connected to the third touch sensor group 3Group is changed to a Tx channel.

When the display device operates in the sleep mode, the touchscreen driving circuit 30 outputs the first driving voltage VEX and the second driving voltage VEXB through respective Tx channels. Here, the first driving voltage VEX and the second driving voltage VEXB can be generated as complementary excitation pulses, as described above. However, the present disclosure is not limited thereto.

When the first touch sensor group 1Group and the third touch sensor group 3Group are operated by pulses having the same shape (or same phase), coupling capacitance is generated in the second touch sensor group 2Group. In this case, the voltage of an Rx channel is boosted like a Tx channel. Accordingly, it is desirable that the phase of the Tx channels disposed at both sides of the Rx channel be inverted such that the output value of the Rx channel is not saturated.

When the display device operates in the sleep mode, the touchscreen driving circuit 30 outputs the driving voltages through respective Tx channels and then receives voltages indicating variations in the mutual capacitors Cm1 and Cm2 through the Rx channels and determines whether knock-on is generated.

When knock-on is not generated, the display device does not display an image and is driven by touch driving signals (mutual touch sensing). When knock-on is generated, the display device exits the sleep mode, displays an image and is driven by touch driving signals (self touch sensing).

Given the large number of capacitors of the touch sensor electrodes, it is difficult for the touchscreen driving circuit 30 to include as many sensing circuits as there are capacitors of the touch sensor electrodes. Since the multiplexers MUXs located at the input terminal of the touchscreen driving circuit 30 repeatedly drives touch channels, the number of sensing circuits is thereby reduced.

In addition, if there is no problem in a frame rate, it is possible to reduce power consumption of the touchscreen driving circuit 30 by increasing the number of channels per multiplexer so as to decrease the number of sensing circuits. In the above description, M channels (e.g. 10 channels) are connected per MUX by being controlled by a MUX signal.

Short-circuited lines may be controlled by increasing (when capability of the touchscreen driving circuit 30 to drive the capacitors of the touch sensor electrodes is excellent) or decreasing (when the capability is poor) the number of short-circuited lines on the basis of the capability of the touch screen driving circuit 30 to drive the capacitors of the touch sensor electrodes.

As shown in FIG. 10, when the display device operates in the sleep mode, the touchscreen driving circuit 30 may use only touch electrodes U_Area present in the inner area in the first to thirty-second group touch sensors 1Group to 32Group without using touch electrodes NU_Area present in the peripheral (or outmost) area of the first to thirty-second group touch sensors.

If values of the touch electrodes present in the peripheral (or outmost) area are not used, considering that the user does not touch the touch electrodes present in the peripheral area, when the knock-on function is used, power consumption can be reduced. When the knock-on function is used, the touchscreen driving circuit 30 may not operate Tx channels, Rx channels or Tx and Rx channels included in the peripheral (or outmost) area in order not to use the touch electrodes NU_Area present in the peripheral area.

A characteristic deviation may be present between the liquid crystal display panel and the touchscreen driving circuit 30. When a characteristic deviation is present between the liquid crystal display panel and the touchscreen driving circuit 30, a deviation is generated between Rx channels. Accordingly, a touch threshold (value) for discriminating presence of touch from absence of touch needs to be set to an experimental value suitable for characteristics of the liquid crystal display panel.

When the display device operates in the sleep mode, the touchscreen driving circuit 30 can determine presence or absence of touch only using absolute values output from Rx channels since the touch screen driving circuit 30 cannot use an internal algorithm. Upon detection of presence of touch, the timing controller outputs a signal for waking up the touchscreen driving circuit 30 from the sleep mode.

FIG. 9 illustrates that touch sensors constitute a group touch sensor in the horizontal direction. However, this is exemplary and touch sensors may constitute a group touch sensor in the horizontal direction or vertical direction depending on the display device model.

According to the first embodiment of the present disclosure, the touchscreen driving circuit 30 performs mutual touch sensing line by line, as described below, when the display device operates in the sleep mode. An example in which the display device is in the sleep mode will now be described.

Referring to FIG. 11, a MUX selector 36 of the touchscreen driving circuit 30 outputs the first MUX signal 1MUX for short-circuiting ten electrodes (Select 1 to 10=All shorted) to select block type touch sensors corresponding to the first line Line 1. Accordingly, the block type touch sensors 0, 32, 64, . . . , 256 and 288 corresponding to the first line Line 1 are changed to a first touch sensor group 1Group.

The driving circuit 32 of the touchscreen driving circuit 30 outputs the first driving voltage to the first touch sensor group 1Group. That is, the first touch sensor group 1Group is connected to a Tx channel. The sensing circuit 34 of the touchscreen driving circuit 30 may be turned off while the driving circuit 32 of the touchscreen driving circuit 30 outputs the first driving voltage.

Referring to FIG. 12, the MUX selector 36 of the touchscreen driving circuit 30 outputs the second MUX signal 2MUX for short-circuiting ten electrodes (Select 1 to 10=All shorted) to select block type touch sensors corresponding to the second line Line 2. Accordingly, the block type touch sensors 1, 33, 65, . . . , 257 and 289 corresponding to the second line Line 2 are changed to a second touch sensor group 2Group.

The sensing circuit 34 of the touchscreen driving circuit 30 senses a mutual capacitance variation through the second touch sensor group 2Group. That is, the second touch sensor group 2Group is connected to an Rx channel. The driving circuit 32 of the touchscreen driving circuit 30 may be turned off while the sensing circuit 34 of the touchscreen driving circuit 30 senses the mutual capacitance variation.

Figure 13:
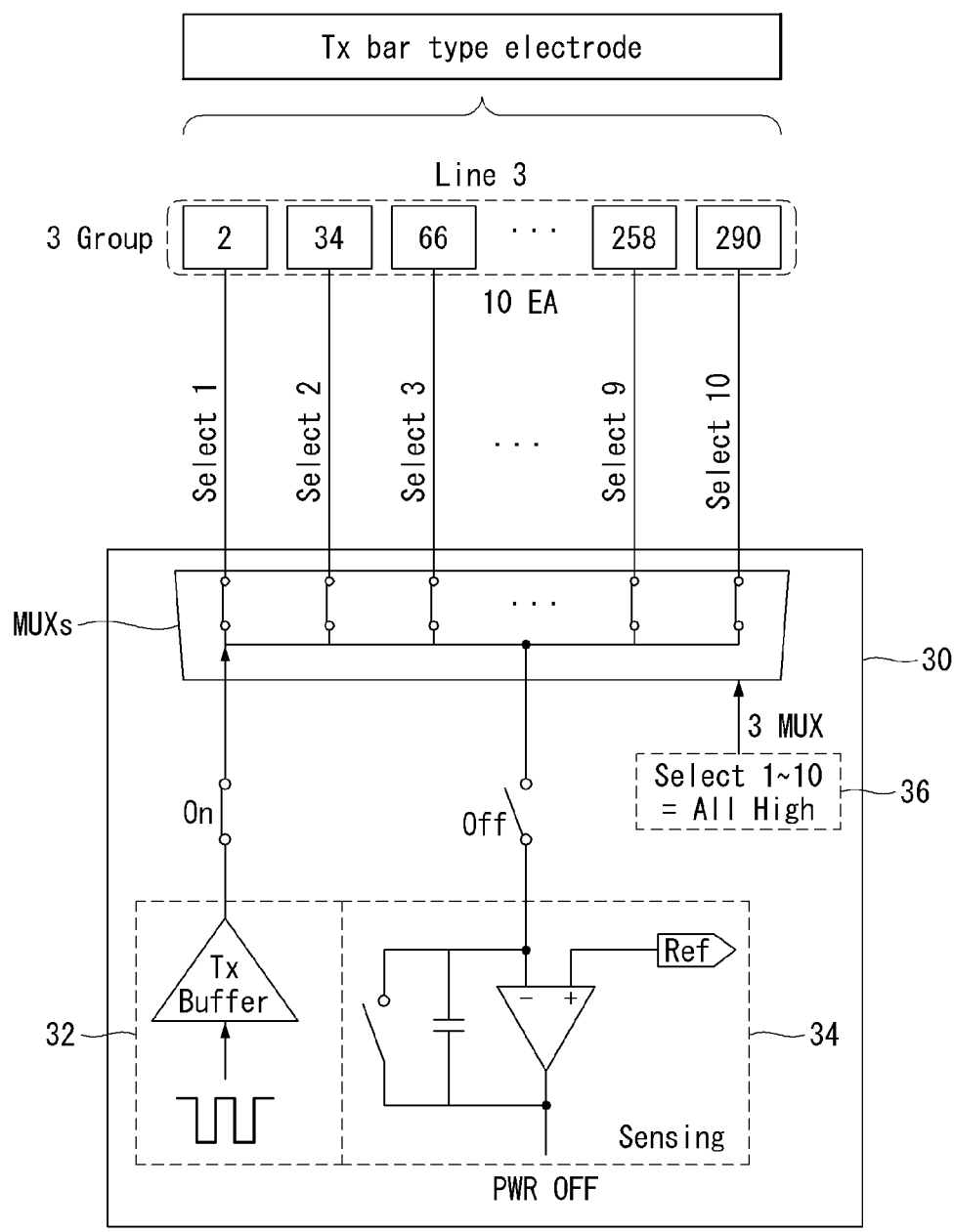
FIG. 13 illustrates driving of a third line shown in FIG. 9.

Referring to FIG. 13, a MUX selector 36 of the touchscreen driving circuit 30 outputs the third MUX signal 3MUX for short-circuiting ten electrodes (Select 1 to 10=All Shorted) to select block type touch sensors corresponding to the third line Line 3. Accordingly, the block type touch sensors 2, 34, 66, . . . , 258 and 290 corresponding to the third line are changed to a third touch sensor group 3Group.

The driving circuit 32 of the touchscreen driving circuit 30 outputs the second driving voltage through the third touch sensor group 3Group. That is, the third touch sensor group 3Group is connected to a Tx channel. The sensing circuit 34 of the touchscreen driving circuit 30 may be turned off while the driving circuit 32 of the touchscreen driving circuit 30 outputs the second driving voltage.

Thus, the touchscreen driving circuit 30 can output a driving voltage to a group corresponding to one line, sense a mutual capacitance variation through a group corresponding to the next line in the aforementioned manner, sense the touchscreen line by line and determine whether knock-on is generated.

When the display device operates in the sleep mode, the touchscreen driving circuit 30 determines only presence or absence of touch rather than detecting coordinates of a touch point. Accordingly, power consumption can be reduced by employing a sensing method capable of determining only whether knock-on is generated in sleep mode state as in the first embodiment of the present disclosure.

When the display device is implemented as in the first embodiment of the present disclosure, a mutual capacitance variation can be detected without an additional circuit by further configuring only the buffer 32 to generate a driving voltage (Tx excitation) in the touchscreen driving circuit 30.

In addition, when the display device is implemented as in the first embodiment of the present disclosure, current consumption can be reduced. Furthermore, multiplexers MUXs included in the touchscreen driving circuit 30 can be used. When it is difficult to drive the sensing block when the touch sensor electrodes are short-circuited by the multiplexers MUXs, the number of short-circuited touch electrodes can be adjusted to reach an appropriate capacitor size, through appropriate control.

In the first embodiment of the present disclosure, the display device uses the mutual touch sensing method having a wider dynamic range and a smaller capacitor size than the self touch sensing method in sleep mode operation. Accordingly, there is no need to add a circuit for improving an SNR according to driving voltage modulation increase, reducing the feedback capacitor size and removing charges.

A description will be given of a second embodiment of the present disclosure.

Second Embodiment

Figures 14, 15:
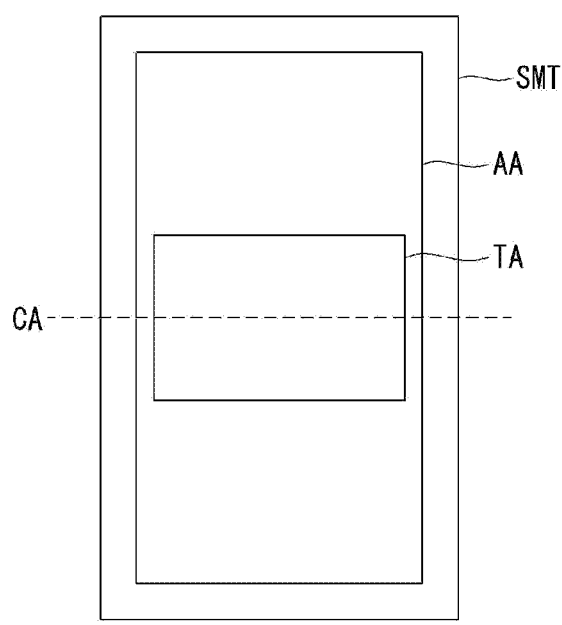
FIG. 14 illustrates a configuration of a touch sensor for sensing on a block basis in a sleep mode operation according to a second embodiment of the present disclosure.
FIG. 15 illustrates a region which short-circuits during block based sensing illustrated in FIG. 14.

FIG. 14 illustrates a configuration of touch sensors for block based sensing according to the second embodiment of the present disclosure and FIG. 15 illustrates a region which is short-circuited during block based sensing illustrated in FIG. 14.

In the above description, the touchscreen driving circuit 30 short-circuits the touchscreen line by line and then senses the touchscreen on a line by line basis so as to determine whether knock-on is generated when the display device operates in the sleep mode.

However, when the display device operates in a specific mode (e.g., sleep mode, image non-display mode and the like), as shown in FIG. 14, the touchscreen driving circuit 30 can short-circuit n (n being an integer equal to or greater than 2) lines (nMUX) in the horizontal direction (or gate line direction) of the touchscreen. Every line may be shorted together into a single block. As shown in FIG. 13, touch sensors 0, 32, 64, 256, 288, 1, 32, 65, 257, 289, 2, 34, 66, 258 and 290 are all shorted together. Here, the touchscreen driving circuit 30 can perform block based sensing. The sensing is performed with self capacitance sensing.

The second embodiment of the present disclosure is implemented such that only a specific area is sensed on a block basis when the display device operates in a specific mode. As shown in FIG. 15, when a display device of a smartphone SMT operates in a specific mode, N (N being an integer equal to or greater than 2) lines can be short-circuited (nMUX) in the horizontal direction of the touchscreen such that only the center area CA of a display screen AA can be sensed on a block basis. Touch electrodes outside of the center area CA are not shorted. The sensing is performed with self-capacitance sensing.

However, the center area is exemplary and an area that can be sensed on a block basis may be changed by a user. In addition, according to the second embodiment of the present disclosure, it is possible to short-circuit all electrodes of the touchscreen and then sense the entire touchscreen as well as sensing the touchscreen on a line or block basis when the display device operates in a specific mode.

While sleep mode operation of the display device is exemplified in the embodiments of the present disclosure, this is exemplary and the present disclosure may be applied in such a manner that a sensing method is switched when the display device operates in a specific mode. To this end, electrodes of the touchscreen are selectively short-circuited to enable sensing in various manners.

For example, the present invention can achieve mutual sensing by grouping N MUXs and using each line as a Tx channel/Rx channel and can also use each line in a self sensing mode. In addition, the present invention can enable mutual sensing by grouping touch sensors into blocks in a predetermined form (e.g., square or rectangular form) and using each block as a Tx channel/Rx channel and can also use each block as a unit sensor in the self sensing mode. Furthermore, the present invention can group all touch sensors into one touch sensor and detect touch through a self sensing method.

As described above, the present disclosure can reduce power consumption while maintaining driving stability and reliability during operation of the electronic device having touch sensors in a specific mode (e.g., sleep mode). In addition, the present disclosure can switch the sensing method of the electronic device between the self capacitance touch sensing method and mutual capacitance touch sensing method. Furthermore, the present disclosure can solve a saturation problem due to a capacitor size of a touch sensor in order to detect touch while implementing a low power mode.

What is claimed is:

1. A display device comprising:
a plurality of touch electrodes; and
a touchscreen driving circuit coupled to the plurality of touch electrodes, the touchscreen driving circuit having a plurality of switches,
wherein in a normal display mode of the display device, the touchscreen driving circuit senses touch via the plurality of touch electrodes using self capacitance touch sensing; and
wherein in a sleep mode of the display device, the touchscreen driving circuit short circuits together a first set of the touch electrodes through the switches and senses touch via the plurality of touch electrodes using mutual capacitance touch sensing by driving a first touch driving signal to the first set of the touch electrodes that are shorted circuited together through the switches.

2. The display device of claim 1, wherein the touchscreen driving circuit is to, in the sleep mode of the display device:
short the first set of the touch electrodes along a line into a first transmit channel:
short a second set of the touch electrodes along a line into a receive channel;
drive the first touch driving signal onto the first transmit channel; and
sense touch from a voltage of the receive channel, the voltage generated based on the touch driving signal on the first transmit channel and a mutual capacitance between the first transmit channel and the receive channel.

3. The display device of claim 2, wherein the first transmit channel is parallel to the receive channel.

4. The display device of claim 2, wherein the touchscreen driving circuit is to:
short a third set of the touch electrodes along a line into a second transmit channel;
drive a second touch driving signal onto the second transmit channel; and
wherein the voltage of the receive channel is further generated based on the second touch driving signal and a mutual capacitance between the second transmit channel and the receive channel.

5. The display device of claim 4, wherein the first touch driving signal and the second touch driving signal are complementary signals.

6. The display device of claim 1, wherein the touch electrodes used for mutual capacitive touch sensing during the sleep mode are the touch electrodes used for self capacitive touch sensing during the normal display mode.

7. A display device comprising:
a plurality of touch electrodes; and
a touchscreen driving circuit coupled to the plurality of touch electrodes, the touchscreen driving circuit having a plurality of switches to selectively short circuit together at least a first set of the touch electrodes;
wherein in a normal display mode of the display device, the touchscreen driving circuit senses touch via the plurality of touch electrodes using self capacitance touch sensing; and
wherein in a sleep mode of the display device, the touchscreen driving circuit short circuits the first set of the touch electrodes together through the switches and senses touch via the first set of short circuited touch electrodes by driving a first touch driving signal to the first set of the touch electrodes that are short circuited together through the switches.

8. The display device of claim 7, wherein the first set of the touch electrodes are shorted along a line into a first transmit channel, and the touchscreen driving circuit is to, in the sleep mode of operation:
short a second set of the touch electrodes along a line into a receive channel;
drive the first touch driving signal onto the first transmit channel; and
sense touch from a voltage of the receive channel, the voltage generated based on the touch driving signal on the first transmit channel and a mutual capacitance between the first transmit channel and the receive channel.

9. The display device of claim 8, wherein the first transmit channel is parallel to the receive channel.

10. The display device of claim 8, wherein the touchscreen driving circuit is to, in the sleep mode of operation:
- short a third set of the touch electrodes along a line into a second transmit channel;
- drive a second touch driving signal onto the second transmit channel; and
- wherein the voltage of the receive channel is further generated based on the second touch driving signal and a mutual capacitance between the second transmit channel and the receive channel.

11. The display device of claim 7, wherein the first set of short circuited touch electrodes comprises all touch electrodes of the display device.

12. The display device of claim 7, wherein the first set of short circuited touch electrodes comprises two or more lines of the touch electrodes.

13. A method of operation in a display device that includes a plurality of touch electrodes, comprising:
- in a normal display mode of the display device, sensing touch via the plurality of touch electrodes using self capacitance touch sensing; and
- in a sleep mode of the display device, sensing touch via the plurality of touch electrodes using mutual capacitance touch sensing by shorting circuiting together a first set of the touch electrodes through a plurality of switches and driving a first touch driving signal to the first set of the touch electrodes that are shorted circuited together through the switches.

14. The method of claim 13, wherein sensing touch in the sleep mode comprises:
- shorting the first set of the touch electrodes along a line into a first transmit channel:
- shorting a second set of the touch electrodes along a line into a receive channel;
- driving the first touch driving signal onto the first transmit channel; and
- sensing touch from a voltage of the receive channel, the voltage generated based on the touch driving signal on the first transmit channel and a mutual capacitance between the first transmit channel and the receive channel.

15. The method of claim 14, wherein sensing touch in the sleep mode comprises:
- shorting a third set of the touch electrodes along a line into a second transmit channel; and
- driving a second touch driving signal onto the second transmit channel,
- wherein the voltage of the receive channel is further generated based on the second touch driving signal and a mutual capacitance between the second transmit channel and the receive channel.

16. A method of operation in a display device that includes a plurality of touch electrodes and a plurality of switches to selectively short circuit together at least a first set of the touch electrodes, comprising:
- in a normal display mode of the display device, sensing touch via the plurality of touch electrodes using self capacitance touch sensing; and
- in a sleep mode of the display device, short circuiting the first set of the touch electrodes together through the switches and sensing touch via the first set of short circuited touch electrodes by driving a first touch driving signal to the first set of the touch electrodes that are short circuited together through the switches.

17. The method of claim 16, wherein the first set of the touch electrodes are shorted along a line into a first transmit channel, and further comprising, in the sleep mode of operation:
- shorting a second set of the touch electrodes along a line into a receive channel;
- driving the first touch driving signal onto the first transmit channel; and
- sensing touch from a voltage of the receive channel, the voltage generated based on the touch driving signal on the first transmit channel and a mutual capacitance between the first transmit channel and the receive channel.

18. The method of claim 17, further comprising, in the sleep mode of operation:
- shorting a third set of the touch electrodes along a line into a second transmit channel;
- driving a second touch driving signal onto the second transmit channel; and
- wherein the voltage of the receive channel is further generated based on the second touch driving signal and a mutual capacitance between the second transmit channel and the receive channel.

19. The method of claim 16, wherein the first set of short circuited touch electrodes comprises all touch electrodes of the display device.

20. The method of claim 16, wherein the first set of short circuited touch electrodes comprises two or more lines of the touch electrodes.

21. A display device comprising:
- a plurality of touch electrodes including a first set of the touch electrodes and a second set of the touch electrodes;
- a plurality of sensing lines including a first set of the sensing lines and a second set of the sensing lines; and
- a touchscreen driving circuit coupled to the first set of the touch electrodes and the second set of the touch electrodes and the touchscreen driving circuit including a first multiplexer and a second multiplexer;
- wherein the first set of the touch electrodes is coupled to the first set of the sensing lines respectively and the second set of the touch electrodes is coupled to the second set of the sensing lines respectively,
- wherein the first multiplexer is capable of short-circuiting the first set of the touch electrodes together through the first set of the sensing lines in a sleep mode of the display device and the touchscreen driving circuit is capable of driving the first set of the touch electrodes through the first set of the sensing lines in the sleep mode of the display device,
- wherein the second multiplexer is capable of short-circuiting the second set of the touch electrodes together through the second set of the sensing lines in the sleep mode of the display device and the touchscreen driving circuit is capable of sensing the second set of the touch electrodes through the second set of the sensing lines in the sleep mode of the display device.

* * * * *